US006634880B2

United States Patent
Cazzani

(10) Patent No.: US 6,634,880 B2
(45) Date of Patent: Oct. 21, 2003

(54) CALIBRATION DEVICE FOR EXTRUDED SECTIONS

(75) Inventor: Fabio Cazzani, Lugano (CH)

(73) Assignee: Omipa S.p.A., Morazzone (VA) (IT)

( * ) Notice: Subject to any disclaimer, the term of this patent is extended or adjusted under 35 U.S.C. 154(b) by 211 days.

(21) Appl. No.: 09/865,725

(22) Filed: May 29, 2001

(65) Prior Publication Data

US 2002/0031565 A1 Mar. 14, 2002

(30) Foreign Application Priority Data

Sep. 14, 2000 (IT) ...................................... MI2000A2006

(51) Int. Cl.[7] ............................................... B29C 47/90
(52) U.S. Cl. ...................... 425/326.1; 425/384; 425/388
(58) Field of Search .................... 425/71, 326.1, 425/384, 388

(56) References Cited

U.S. PATENT DOCUMENTS

| 3,812,230 A | | 5/1974 | Takahashi | |
| 4,146,563 A | | 3/1979 | Ratafia et al. | |
| 4,401,424 A | * | 8/1983 | De Zen | 425/388 |
| 4,408,970 A | * | 10/1983 | Bustin et al. | 425/326.1 |
| 5,516,270 A | * | 5/1996 | Lehtinen | 425/71 |
| 5,648,102 A | * | 7/1997 | Czarnik | 425/71 |
| 5,762,860 A | * | 6/1998 | Ashcraft | 425/326.1 |

FOREIGN PATENT DOCUMENTS

| DE | 30 13 020 A1 | 10/1981 |
| EP | 0 823 873 A | 2/1998 |
| GB | 959440 | 6/1964 |

* cited by examiner

*Primary Examiner*—James P. Mackey
*Assistant Examiner*—Joseph Leyson
(74) *Attorney, Agent, or Firm*—Nixon & Vanderhye, P.C.; Frank P. Presta

(57) ABSTRACT

A calibration device for flat extruded sections comprises at least two flat calibration plates (10) parallel to one another at a distance apart such as to form a gap (1) through which an extruded section (11) can pass, each calibration plate comprising cooling means for cooling the plate and vacuum-forming means for creating a vacuum in the gap (1), the calibration device comprising air-intake means for introducing air into the gap (1), the air-intake means being designed to form air cushions or pads between the flat surfaces of the extruded section (11) and the flat surfaces of the calibration plates (10).

10 Claims, 1 Drawing Sheet

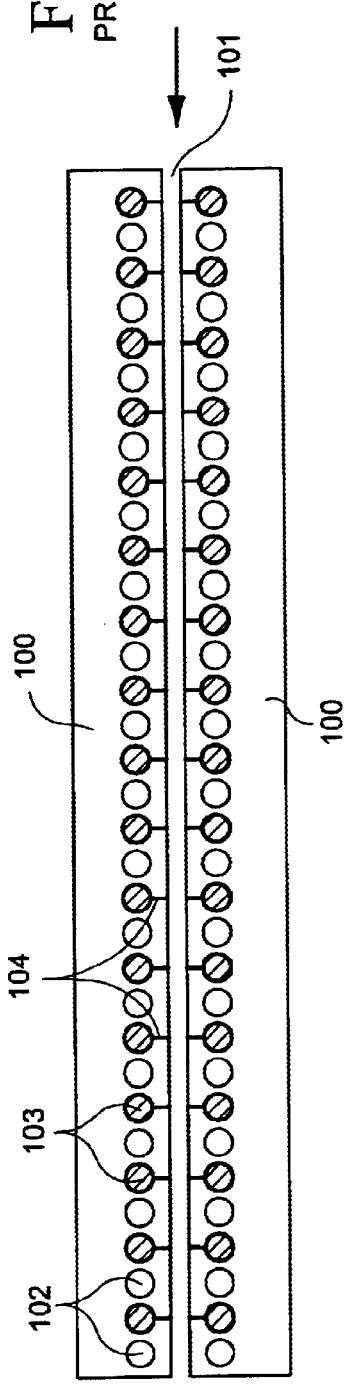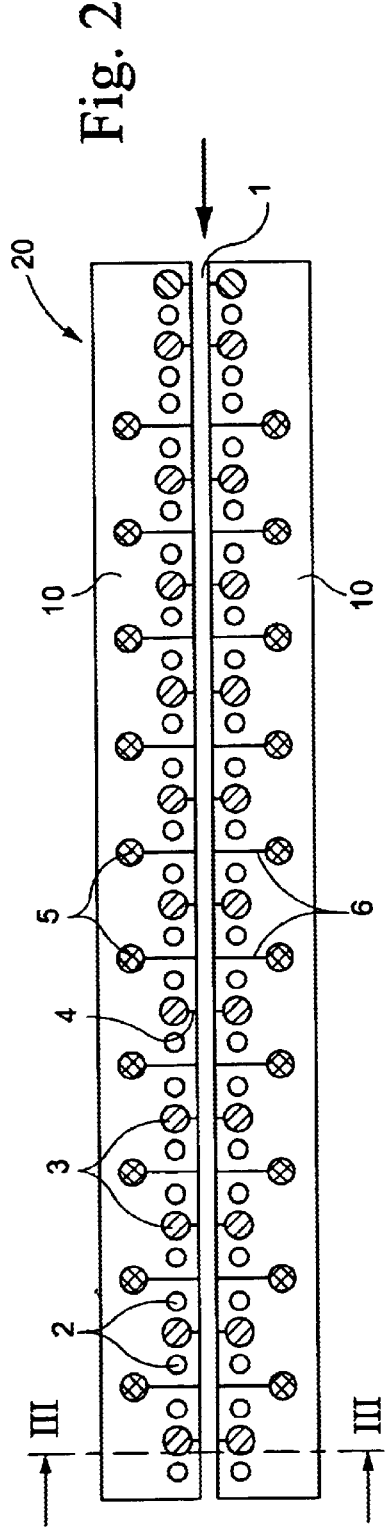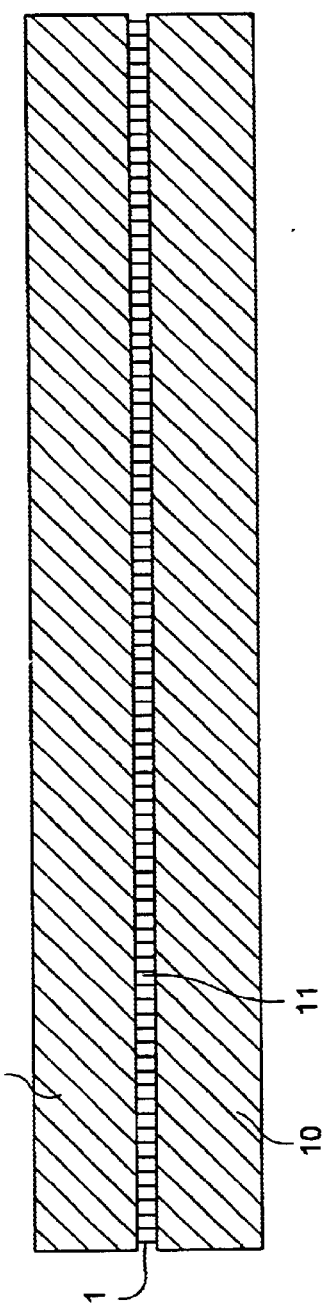

CALIBRATION DEVICE FOR EXTRUDED SECTIONS

BACKGROUND OF THE INVENTION

The present invention relates to a calibration device for extruded sections, in particular for hollow sections, pipes and alveolar plates of any geometrical structure and made of any extrudable thermoplastic material.

In systems for extrusion of plastic materials, molten extruded plastic material coming from an extrusion die head and having a closed-cell geometrical shape is made to pass through a calibration assembly which enables the surfaces of the extruded section to be cooled off, at the same time maintaining the geometrical shape impressed by the die head.

The calibration assemblies according to the prior art are provided with calibration plates as illustrated in the cross-sectional view of FIG. 1 and designated by the reference number 100. FIG. 1 shows two calibration plates 100 arranged at an appropriate distance apart so as to leave a gap 101 through which the extruded section can pass.

Each plate 100 is provided with ducts 102 for the circulation of a coolant and ducts 103 for vacuum. The ducts 103 for vacuum have radial slits 104 that set them in communication with the gap 101 through which the extruded section is to pass. The cooling ducts 102 are connected to a cooling system, and the vacuum ducts 103 are connected to a vacuum-forming system.

In order to enable cooling and maintenance of the geometrical shape of the extruded section, the calibration plates 100 are provided with a cooling circuit, made up of the ducts 102, to which a refrigerating unit may be connected in the case where an alveolar section of plastic material of the PP-HDPE type is to be produced, or else a thermoregulation control unit may be connected in the case where the extrusion material employed is PC-PMMA.

In order to cause the surfaces of the extruded section to adhere or closely fit to the calibration plates 100 and then perform calibration of the extruded section, vacuum pumps are used which are connected to the vacuum ducts 103, in such a way as to create a vacuum in the slits 104 and hence in the gap 101, thus causing the surface of the extruded section to adhere to the plates 100.

However, the aforesaid calibration devices according to the prior art have a number of drawbacks.

In fact, the adhesion of the extruded section to the surfaces of the calibration plates 100 due to vacuum inevitably creates a considerable friction between the extruded section and the plates. This impairs the ease of slip of the extruded section, and consequently reduces the sliding speed of the extruded section, and hence the out put capacity of the system or plant.

In addition, the aforesaid high-friction sliding of the extruded section on the calibration plates spoils the surface quality of the product and decreases its optical characteristics. For this reason, with the prior art calibration devices it is not possible to obtain perfectly smooth surfaces having optimal optical characteristics.

SUMMARY OF THE INVENTION

An object of the present invention is to eliminate the drawbacks of the prior art by providing a calibration device for flat extruded sections that enables high production rates to be achieved and at the same time ensures an excellent surface quality of the extruded section.

The calibration device according to the invention comprises two flat calibration plates arranged parallel to one another and at a distance apart such as to form a gap through which a flat extruded section can pass. Each calibration plate comprises a cooling circuit for cooling the plate and a vacuum circuit for creating a vacuum in the gap in which the extruded section is to pass.

The peculiar feature of the calibration device according to the invention is that the said device is provided with air-intake means for introducing air into the gap between the calibration plates in such a way as to form air cushions or pads between the flat surfaces of the extruded section and the flat surfaces of the calibration plates.

The said air cushions tend to reduce the sliding friction between the surfaces of the section that advances through the gap and the surfaces of the calibration plates. In this way, the section can advance at a higher speed than in the case where no air cushions are provided, with the result that a higher production rate is achieved.

In addition, the aforesaid reduction in the sliding friction between the surfaces of the section and those of the plates guarantees a lower degree of deterioration of the surfaces of the section, with the result that products with a better surface finish, and hence a better optical quality, are obtained.

In addition, the air introduced into the gap of the calibration device is sucked in by means of the vacuum circuit. Consequently, there is a continuous circulation of fresh, cool air which comes into contact with the surfaces of the section, thus improving the cooling characteristics of the calibration device according to the invention.

BRIEF DESCRIPTION OF THE DRAWINGS

Further characteristics of the invention will emerge more clearly from the ensuing detailed description relating to an embodiment thereof which is presented purely by way of example and hence in no way limits the scope of the present invention, and which is illustrated in the annexed drawings, where:

FIG. 1 is a longitudinal sectional view of a calibration device according to the prior art;

FIG. 2 is a longitudinal sectional view of a calibration device according to the present invention; and FIG. 3 is cross-sectional view, taken along the line III—III of FIG. 2, illustrating an alveolar section enclosed between two calibration plates.

DETAILED DESCRIPTION OF THE INVENTION

With reference to FIGS. 2 and 3, a calibration device, designated as a whole by reference number 20, according to the invention is described. The calibration device 20 comprises two calibration plates 10, each having a substantially rectangular cross section and longitudinal section. The two calibration plates 10 are set parallel to one another at a distance apart such as to form a gap 1 through which the extruded section is to pass. By way of example, FIG. 3 shows an extruded section in the form of an alveolar section 11.

Each calibration plate 10 comprises a plurality of cooling ducts 2, which are connected together and form the cooling circuit of the calibration device 20. The cooling ducts 2 can be set in communication with a refrigerating system which introduces coolant into the ducts 2.

Each calibration plate 10 moreover comprises a plurality of vacuum ducts 3 which are connected together and constitute a circuit for forming a vacuum in the gap 1 of the calibration device 20. The vacuum ducts 3 can be set in communication with a pneumatic system, such as a vacuum pump, which sucks air from the said vacuum ducts 3.

Each vacuum duct 3 is in communication with a respective vacuum slit 4 which opens into the gap 1. In this way, the gap 1 is in communication with the vacuum ducts 3 through the vacuum slit 4. Consequently, when the pneumatic system sucks in air from the vacuum ducts 3 through the vacuum slits 4 a negative pressure is created in the gap 1, which enables the surfaces of the section 11 to closely fit to the surfaces of the calibration plates 10.

According to the invention, each calibration plate 10 moreover comprises a plurality of air ducts 5, connected together and constituting a circuit for air intake into the calibration device 20. The ducts 5 for air intake can be set in communication with the pneumatic system, which introduces compressed air into them.

Each air duct 5 is in communication with a respective air slit 6 which opens out into the gap 1. In this way, the gap 1 is in communication with the air ducts 5 through the air slit 6. Hence, when the pneumatic system introduces compressed air into the air ducts 5, through the air slits 6, air is introduced into the gap 1 against the surfaces of the section 11.

In this way, air cushions are created between the surfaces of the extruded section 11 and the calibration plates 10. The said air cushions enable a reduction in the friction generated between the surfaces of the section 11 and the plates 10.

The pressure and rate of supply of the air cushions can be regulated. In fact, after coming into contact with the surfaces of the extruded section within the gap 1, air is sucked through the vacuum slits 4 in a continuous process. This continuous process of introduction and suction of air means that new cool air in contact with the surfaces of the section 11 is always available, and at the same time the cooling capacity of the calibration device 10 is increased.

Numerous modifications and variations as regards details, all of which lying within the reach of a person skilled in the art, may be made to the present embodiment of the invention, the said modifications and variations falling in any case within the scope of the present invention as expressed in the appended claims.

What is claimed is:

1. A calibration device for a flat extruded section comprising two flat calibration plates (10) set parallel to one another at a distance apart such as to form a gap (1) through which an extruded section (11) can pass, each calibration plate comprising cooling means for cooling the plate and vacuum means for creating a vacuum in said gap (1), characterized in that said calibration device comprises air-intake means for introducing air into said gap (1), said air-intake means being designed to form air cushions between the flat surfaces of the extruded section (11) and the flat surfaces of the calibration plates (10).

2. The device according to claim 1, characterized in that said air-intake means comprise an air circuit made in said calibration plates (10) and connected to a pneumatic system.

3. The device according to claim 2, characterized in that said air circuit comprises a plurality of air ducts (5) communicating together and spaced along the length of the calibration plates, and air slits (6) that set said air ducts (5) in communication with said gap (1).

4. The device according to claim 1, characterized in that control means are provided for controlling the pressure of air introduced by said air-intake means.

5. The device according to claim 1, characterized in that said vacuum means comprise a vacuum circuit made in said calibration plates and connected to a pneumatic system comprising a vacuum pump.

6. The device according to claim 5, characterized in that said vacuum circuit comprises a plurality of vacuum ducts (3) which are provided in said calibration plates, and vacuum slits (4) that set said vacuum ducts (3) in communication with said gap (1).

7. The device according to claim 1, characterized in that said cooling means comprise a cooling circuit made in said calibration plates and connected to a cooling system.

8. The device according to claim 7, characterized in that said cooling circuit comprises a plurality of cooling ducts (2) which are provided in said calibration plates and through which a coolant can flow.

9. The device according to claim 1, characterized in that said calibration plates (10) are of one piece construction and have a substantially rectangular cross section and longitudinal section.

10. The device according to claim 1, characterized in that the air cushions formed by said air-intake means are continuously removed by said vacuum means to continuously bring new cool air into contact with the flat surfaces of the extruded section (11) to increase the cooling cap[ ]city of the calibration device.

* * * * *